(12) United States Patent
Navon et al.

(10) Patent No.: US 11,221,092 B2
(45) Date of Patent: Jan. 11, 2022

(54) SYSTEM AND METHOD FOR SEALING WIRES, CABLES, PIPES AND DRAIN HOLES THROUGH BUFFER

(71) Applicant: Zohar Diuk LTD., Tel-Aviv, IL (US)

(72) Inventors: Edo Navon, Ramat Ha'Sharon (IL); Dror Navon, Nes Ziona (IL)

(73) Assignee: ZOHAR DIUK LTD., Tel-Aviv (IL)

( * ) Notice: Subject to any disclaimer, the term of this patent is extended or adjusted under 35 U.S.C. 154(b) by 0 days.

(21) Appl. No.: 16/290,910

(22) Filed: Mar. 3, 2019

(65) Prior Publication Data
US 2019/0271415 A1  Sep. 5, 2019

Related U.S. Application Data

(60) Provisional application No. 62/638,169, filed on Mar. 4, 2018.

(51) Int. Cl.
| | | |
|---|---|---|
| *F16K 15/04* | (2006.01) | |
| *F16L 5/02* | (2006.01) | |
| *B63J 2/00* | (2006.01) | |
| *E04H 3/08* | (2006.01) | |
| *H02G 15/013* | (2006.01) | |

(52) U.S. Cl.
CPC ............ *F16L 5/027* (2013.01); *F16K 15/04* (2013.01); *B63J 2/00* (2013.01); *E04H 3/08* (2013.01); *H02G 15/013* (2013.01)

(58) Field of Classification Search
CPC ......... F16K 15/04; E04H 3/08; H02G 15/013; F16L 5/027
See application file for complete search history.

(56) References Cited

U.S. PATENT DOCUMENTS

| | | | | |
|---|---|---|---|---|
| 3,232,644 A | * | 2/1966 | Pfeifer | F16L 37/008 285/194 |
| 3,489,440 A | | 1/1970 | Brattberg | |
| 3,568,977 A | * | 3/1971 | Nelson | F16K 15/148 251/148 |
| 4,192,338 A | * | 3/1980 | Gerulis | F15B 13/01 137/106 |

(Continued)

FOREIGN PATENT DOCUMENTS

| | | |
|---|---|---|
| IL | 218946 | 11/2013 |
| IL | 247372 | 2/2018 |
| WO | 2008/091219 | 7/2008 |

*Primary Examiner* — Matthew W Jellett
*Assistant Examiner* — Christopher D Ballman
(74) *Attorney, Agent, or Firm* — Roach, Brown, Mccarthy & Gruber, P.C.; Kevin D. McCarthy

(57) ABSTRACT

A sealing set may be used for sealing and draining a liquid and may comprise a check valve and a mating press unit. When the check valve and the mating press unit may be separated, the check valve may be sealed and may prevent flow of liquid or gas from the first end to the second opening, and when the mating press may be pressed against the check valve so that the third end is inserted into the second end, a flow of liquid or gas may be opened between the two ends. The check valve may comprise a hollow elongated cylinder; a sealing gasket; and a mass and a pressing means configured to press the mass against the sealing gasket for sealing an end. The press unit may comprise a second hollow elongated cylinder and may include one or more holes on the third end perimeter.

15 Claims, 5 Drawing Sheets

(56) References Cited

U.S. PATENT DOCUMENTS

| | | | |
|---|---|---|---|
| 4,197,875 A | 4/1980 | Schieferstein | |
| 4,664,144 A * | 5/1987 | Lemmon | B60K 15/077 137/44 |
| 5,107,890 A | 4/1992 | Gute | |
| 5,275,196 A * | 1/1994 | Mitchell | F16K 15/04 137/224 |
| 6,105,610 A * | 8/2000 | Watkins, II | F16K 15/04 137/516.29 |
| 6,299,413 B1 * | 10/2001 | Stahlman | F04B 5/02 417/440 |
| 6,521,840 B1 | 2/2003 | Kreutz | |
| 6,558,141 B2 * | 5/2003 | Vonalt | F04B 53/143 417/554 |
| 6,721,483 B2 * | 4/2004 | Grubish | G02B 6/4444 174/92 |
| 7,025,087 B2 * | 4/2006 | Weinberger | F04B 53/101 137/271 |
| 7,311,118 B2 * | 12/2007 | Doutt | F16K 15/044 137/15.18 |
| 7,806,142 B2 * | 10/2010 | Baros | F16K 15/04 137/878 |
| 8,511,716 B2 * | 8/2013 | Brandt | F16L 5/027 285/140.1 |
| 8,869,824 B2 * | 10/2014 | Arov | F16K 31/52408 137/456 |
| 9,803,762 B2 * | 10/2017 | Kim | F16K 15/04 |
| 9,954,349 B2 * | 4/2018 | Rehder | F16L 5/027 |
| 10,125,885 B2 * | 11/2018 | Hsiao | F16L 37/248 |
| 10,591,075 B2 * | 3/2020 | Klaphake | F16K 25/005 |
| 2006/0188380 A1 * | 8/2006 | Strong | F04B 53/22 417/555.1 |
| 2008/0178948 A1 * | 7/2008 | Wilmshurst | F16K 15/04 137/513.5 |
| 2011/0255996 A1 * | 10/2011 | Wickstead | F16K 15/04 417/53 |
| 2017/0292506 A1 * | 10/2017 | Shultz | F04B 53/14 |
| 2018/0291891 A1 * | 10/2018 | Scopelite | F16K 15/048 |

* cited by examiner

SYSTEM AND METHOD FOR SEALING WIRES, CABLES, PIPES AND DRAIN HOLES THROUGH BUFFER

TECHNICAL FIELD

This disclosure relates generally to a system and method for sealing, and in particular to a system and method for sealing wires, cables, pipes and drain holes through buffer.

BACKGROUND

There is an importance to isolate an external environment or area from an internal environment or area in many different fields and applications, such as in ships, labs, operating rooms, clean rooms and safety rooms.

Safety requirements in these fields require the avoidance of a leakage of gas, water or a fire emission to an internal environment where people or equipment are staying. A buffer (such as a wall) is commonly used for dividing, separating, or isolating the internal (or indoor) environment from the external (or outdoor) environment. In some cases, it is required to completely block an external hazard, such as gas, fire and/or water (resulting from an external source leakage, emission or biological state, or an external pollution) from penetrating or entering the interior area, or to significantly delay the diffusion from the exterior environment to the interior one.

In an example of protection from a direct or indirect explosion, it is typically required to seal the interior area from the exterior one, in order to provide an explosion proof solution where the sealing capabilities are sustained even under a high shock or pressure.

Common protection scheme involves a safety room made of concrete and unique shielded doors and windows, used for protecting the interior environment from external explosion or other exterior hazard such as gas, fire, so that the people staying in the room are not in a risk. Such rooms may be used as regular rooms in non-emergency situations, and as such typically include an air condition system, requiring at least four transitions holes. Two copper pipes (usually in different sizes) to be passed into the room, one electric cable for supplying electric power to the room, and a pipe for draining an air-condition leakage water from the room to the outside. Such pipes may render the room vulnerable due to degradation of the room sealing or isolation from the exterior environment.

In general, various diameters and materials of pipes, cables and wires are used to pass various resources in a buffer or wall between the exterior and protected interior environments. For example, a pipe may be made of a copper, while an electric cable may be rubber coated. Further, an air condition system typically produces some amount of water, depending on the humidity or moisture percentage in the room, which needs to be drained to the room exterior, requiring a special sealed element to be used.

In some cases, the sealing of pipes or cables that pass through a buffer (such as a wall) is by using a rubber or harden ointment. Such solution is not well suited for fire blocking, and typically cannot adequately protect against high pressure and shock that are explosion generated. Further, a common water draining pipe and tap water that are in used for a sealing room are not always easy to be operated in the event of emergency.

A lead through device for cables or pipes is described in WO 2008/091219 to HEDSTRÖM, Hans. The invention comprises an outer sealing frame, in which at least one sealing module is arranged surrounding a cable or a pipe, and which at least one sealing module is designed to fill out the opening of the sealing frame together with at least one compression unit. The sealing between wall, gasket and sealing frame is achieved in that an expansion unit, comprising an expander of elastic material, pressure plates and screws, which at tightening compress the expander between the pressure plates and the sealing frame, expands the expander towards the inside of the wall and presses the frame against the gasket on the outer side of the wall. A tight lead through inlet frame device is describes in U.S. Pat. No. 3,489,440 to Nils Arthur Johan Brattberg.

A cable transit device, or cable penetration device is described in U.S. Pat. No. 6,521,840 B1 by Tomas Kreutz. The cable devise includes a tubular sleeve that has means at one end for fastening the device to a wall opening, and that has at its other end a thread, which interacts with a thread on a nut. The nut includes a support shoulder and the device includes a rubber sleeve which is located in the tubular sleeve and has an outer diameter corresponding to the inner diameter of the tubular sleeve. The rubber sleeve is accommodated between the circular shoulder of the tubular sleeve and the support shoulder of the nut. The device also includes a plurality of module elements, each containing a cable accommodating channel and each being divided to allow lateral access to the channel/channels. The modules together fill-out the opening of the rubber sleeve and have a shape that corresponds to the resultant outer contour of the mutually sealingly combined modules. An apparatus for conveying piping and wiring into a fortified room is described in Israel Patent No. 218946 to Oren Skutnik and Yaron Aviv.

Ball check valves are well known in the art and are being used in many areas. For example, such a ball check valve is described in U.S. Pat. No. 5,107,890A to Robert M. Gute. The ball check valve has a body member, a conical spring, a ball and valve seat. The valve seat includes a coined seating surface to reduce leakage. Another ball check valve is described in U.S. Pat. No. 4,197,875A to Robert J. Schieferstein, et al having a fluid port, a ball moveable toward and away from the port, a seating surface surrounding the port and an elastomeric sealing element. The seating surface has a conical annular surface extending radially outwardly away from the ball and an annular ridge between the port and the conical surface. The sealing element has an outer sealing surface for contacting the conical seating surface and an annular groove for receiving the seating surface ridge. On its ball side, it has an annular outer surface and an inner sealing surface for contacting the ball. A sealing element retainer contacts the outer portion of the elastomeric sealing element outer surface on its ball side to hold it in position.

A magnetic ball check valve is described in U.S. Pat. No. 3,893,651A to Donald Frederick Uecker. The magnetic ball check valve is for closing off dry tubes, wells or thimbles upon removal of a probe such as an instrument. The valve has a conical chamber containing the ball and a magnet exterior of the chamber to pull the ball upwardly to close off the opening. The insertion of the probe pushes the ball down and laterally outwardly, whereby the probe can pass downwardly through the chamber.

Dowty seal or Dowty washer is a type of bonded seal used to provide a seal around a screw or bolt. The Dowty seals are widely manufactured and they are available in a range of standard sizes and materials.

Another general type of stuffing box, used to seal a rotating or reciprocating shaft against a fluid, is called "Gland seal". The most common example is in the head of a tap (faucet) where the gland is usually packed with string which has been soaked. The gland nut allows the packing material to be compressed to form a watertight seal and prevent water leaking up the shaft when the tap is turned on. Other types of sealed connections without moving parts are also sometimes called glands; for example, a cable gland or fitting that connects a flexible electrical conduit to an enclosure, machine or bulkhead facilitates assembly and prevents liquid or gas ingress.

O-Ring is a well-known gasket in a form of a ring with a circular cross section, typically made of pliable material, used to seal connections in pipes, tubes, etc.

The continuously growing risk of biological and chemical attacks, along with the governments and public awareness of the coming challenges in respect to these hazards drive the need for improved sealed, safe and protected spaces, providing easier installation time, lasting long life, easy to use and flexibility for many uses and environments. In consideration of the foregoing, it would be an advancement in the art to provide a system and method of sealing that is easy to be installed, lasting long life, flexible for use in many applications, simple, cost-effective, convenient, and easier to use.

SUMMARY

Any apparatus herein may be used for isolation of a wall or a surface between internal and external environments. Any apparatus herein may comprise an enclosure housing a metal plate and configured for sealing and attaching to the wall, and any metal plate herein may be having at least first, second, and third openings for passing pipe, cable, or gas through the wall. Any apparatus herein may comprise sealing nuts installed in the first, and second openings for passing a cable or wires while sealing the first and second openings; and a sealing nipple installed in the third opening and operative to pass gas via a pipe between the internal and the external environments while sealing the third opening. Any metal plate herein may comprise holes and may be attached to the enclosure using multiple threaded screws and nuts via the holes.

Any apparatus herein may be configured so when installed in an opening in the wall, it protects the internal environment against direct or indirect explosion, shock, blast, or pressure from the external environment, or protects the internal environment against emission, or biological hazard from the external environment. Any apparatus herein may be configured so when installed in an opening in the wall, prevents leakage of gas, liquid, or fire from the external environment to the internal environment. Any internal environment herein may comprise, or may be part of, a ship, lab, operating room, clear room, or safety room.

Any enclosure herein may be a box-shaped enclosure, and any openings herein may be threaded openings or holes. Any enclosure herein may comprise an addition opening for installing a check valve operative to drain a liquid from the internal to the external environment while sealing the addition opening, and any check valve herein may be an auto-seal zero pressure check valve. Alternatively or in addition, any check valve herein may be operative to be operated by a user to be in first and second states, where in the first state a liquid passes from the internal to the external environment, and in the second state a sealing is provided and a liquid is blocked from passing from the internal to the external environment.

Any apparatus herein may be used in combination with an air conditioning unit in the internal environment, and any cable herein may be connected via the first opening to supply electric power from the external environment to the air conditioning unit, water from the unit may be drained via the second opening, and gas may be provided to the unit via the pipe in the third opening.

Any sealing set herein may be used for sealing and draining a liquid. Any sealing set herein may comprise a check valve and a mating press unit. Any check valve herein may comprise a first hollow elongated cylinder that may comprise a first end having a first round opening and a second end having a second round opening, where the second opening diameter may be less than the elongated cylinder diameter; a sealing gasket that may be attached to the second end; and a mass and a pressing means configured to press the mass against the sealing gasket for sealing the second end. Any press unit herein may comprise a second hollow elongated cylinder that may comprise a third round end and a fourth round end having a fourth round opening, the third round end defining a diameter that may be smaller than the second opening diameter and may be having one or more holes on the third end perimeter. When the check valve and the mating press unit may be separated, the check valve may be sealed and may prevent flow of liquid or gas from the first end to the second opening, and when the mating press may be pressed against the check valve so that the third end is inserted into the second end, a flow of liquid or gas may be opened between the first end and the fourth end.

Any check valve herein may be an auto-seal zero-pressure check-valve, and any sealing gasket herein may consists of, or may comprise, an 'O'-ring. Any pressing means herein may comprise a spring, and the third end may be inserted into the second end while pressing the spring. Any check valve herein may include a cylindrical cavity, and the spring may be housed in the cavity. Any mass herein may be ball-shaped, and the first end may comprise, or may be shaped as, a nipple. Any check valve herein may comprise an open nut at the second end.

Any sealing arrangement herein may be used for sealing around a straight pipe defining a center line, and any arrangement herein may comprise a first round flat surface around the pipe that is perpendicular to the center line; a second round flat surface around the pipe that is diagonal to the center line; and an 'O' ring around the pipe. Any 'O' ring herein may be pressed between the pipe, the first surface, and the second surface for sealing. The angle or slope of the second round surface may be 45° from the center line.

Any arrangement herein may comprise a hollow elongated cylinder enclosing part of the pipe, and the first round flat surface may be an end of the elongated cylinder. The elongated cylinder may comprise a sealing mechanism for sealingly attaching to a plate or wall, and the sealing mechanism may comprise, or may be based on, a Dowty seal, and the elongated cylinder may be a threaded nipple.

Further, the elongated cylinder may comprise an external thread. And any arrangement herein may comprise a flare nut having an internal thread, and the 'O' ring may be pressed by screwing the internal thread on the external thread. Any 'O' ring herein may be pressed by the pipe in a first force level, the 'O' ring may be pressed by the first surface in a second force level, and the 'O' ring may be pressed by the second surface in a third force level, and the first, second, and third forces levels may be substantially equal. Each one of the first, second, and third forces levels may be within same value of each one of the other force levels.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope.

DETAILED DESCRIPTION

Figure 1:
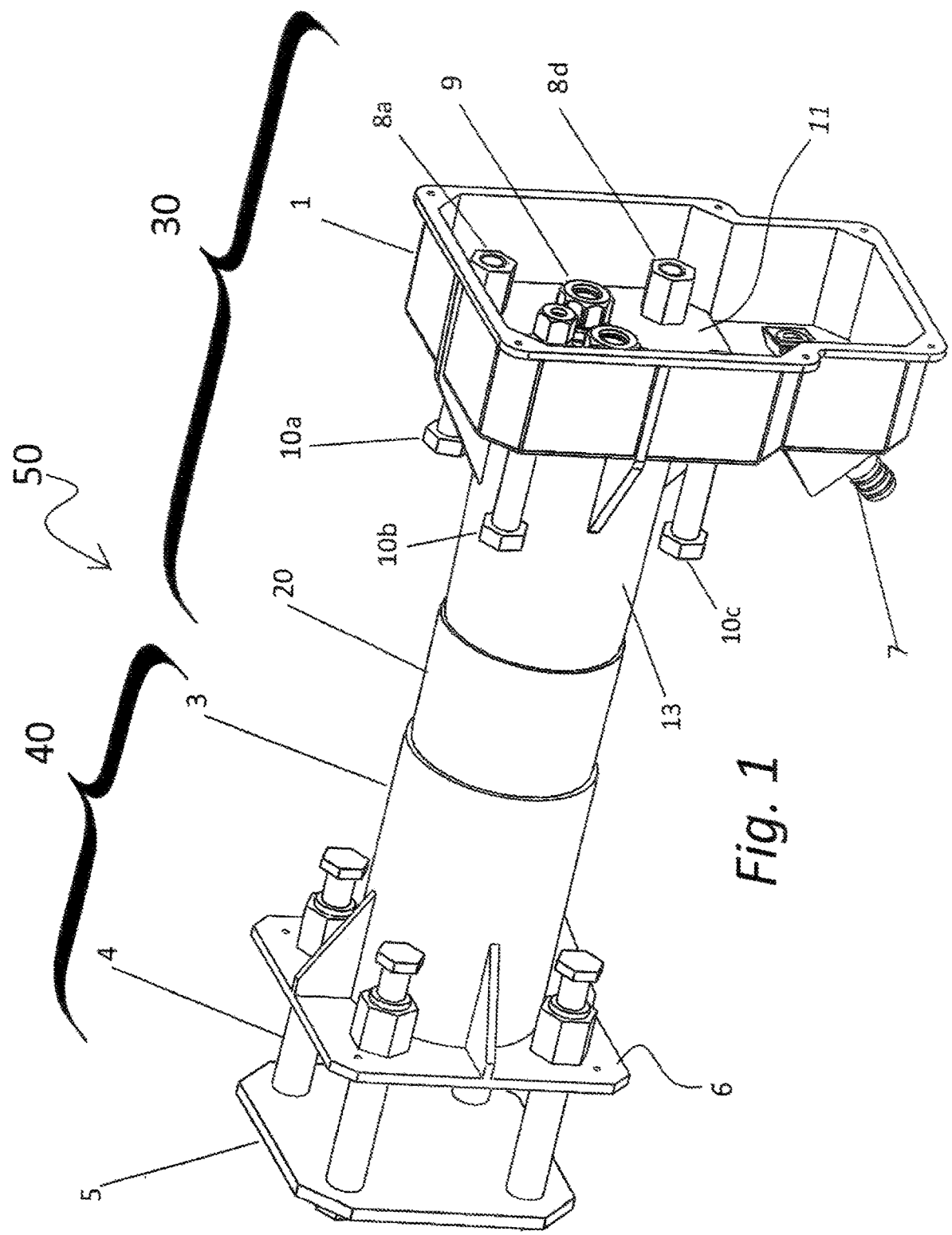
FIG. 1 illustrates a perspective view of a sealing system.

The principles and operation of a sealing system according to the present invention may be understood with reference to the figures and the accompanying description wherein similar components appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the present invention, as represented in the figures herein, is not intended to limit the scope of the invention, as claimed, but is merely representative of embodiments of the invention. It is to be understood that the singular forms "a," "an," and "the" herein include plural referents unless the context clearly dictates otherwise. By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIG. 1 illustrates a sealing system assembly 50 that comprises an inner part assembly 30 and an external part assembly 40, for use with an example of a safety room that is built of a concrete and may include unique shielded doors and windows that are explosion-proof and protects from any exterior hazard, such as gas, fire or explosion, allowing for non-endangerment of people staying in such a safety room. The inner part assembly 30 is installable so that it faces the interior environment (room inside), while the external part assembly 40 is installable facing the external room environment, so that the system assembly 50 provides a sealed path for passing pipes or cables therein, while sustaining the safety room protection and isolation functionalities.

Figure 2:
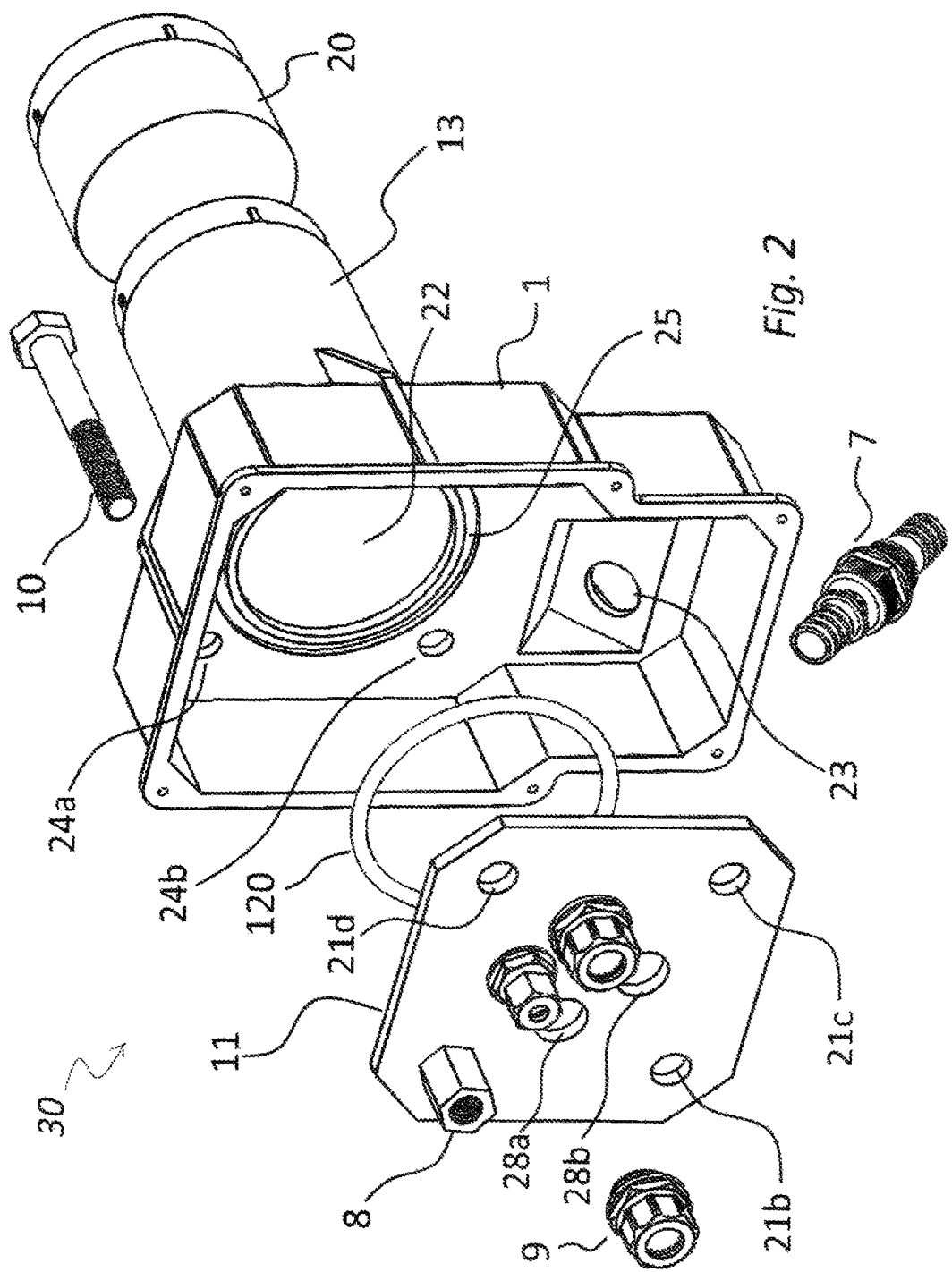
FIG. 2 illustrates an exploded perspective view of an inner part of a sealing system.

The inner part assembly 30, which is shown in detailed in FIG. 2, comprises a box-shaped enclosure 1 having a cylinder 13, through which the pipes or cables may be carried. A metal plate 11 is used for sealing of the enclosure 1 using four threaded screws (exampled by the screw 10 in FIG. 2) 10a, 10b, and 10c (the fourth one not shown in the figures) and their respective nuts (exampled by the nut 8 in FIG. 2) 8a and 8d (nuts 8c and 8b not shown in the figures). Upon securing the metal plate 11 to the enclosure 1 using the nuts, the metal plate 11 may, for example, be used for preventing a blast to the safety room interior environment in case of an external explosion.

A metal plate can be pressed to a box-shaped enclosure using less than four threaded screws but this should be tested in a real explosion.

The metal plate 11 comprises threaded holes for passing cables, wires, or pipes there through. Any number of holes may be used, according to required number of cables, wires, or pipes that are to be used. One example, as shown in FIG. 2, is of four threaded holes. A sealing nut assembly 9, having a diameter fitting the corresponding opening diameter, may be used for each opening in the metal plate 11 that may be used for passing cables, wires, or pipes. The outer diameter of the sealing assembly 9 matches the threaded hole, and the inner diameter of the sealing assembly 9 matches the cable, wire, or pipe that needs to pass through the sealing assembly 9.

The inner part assembly 30 further supports water draining capabilities by using an auto-seal zero pressure check valve assembly 7 that is installed in the bottom of the enclosure 1 in order to maintain a drain water flow towards the room exterior.

Figure 5:
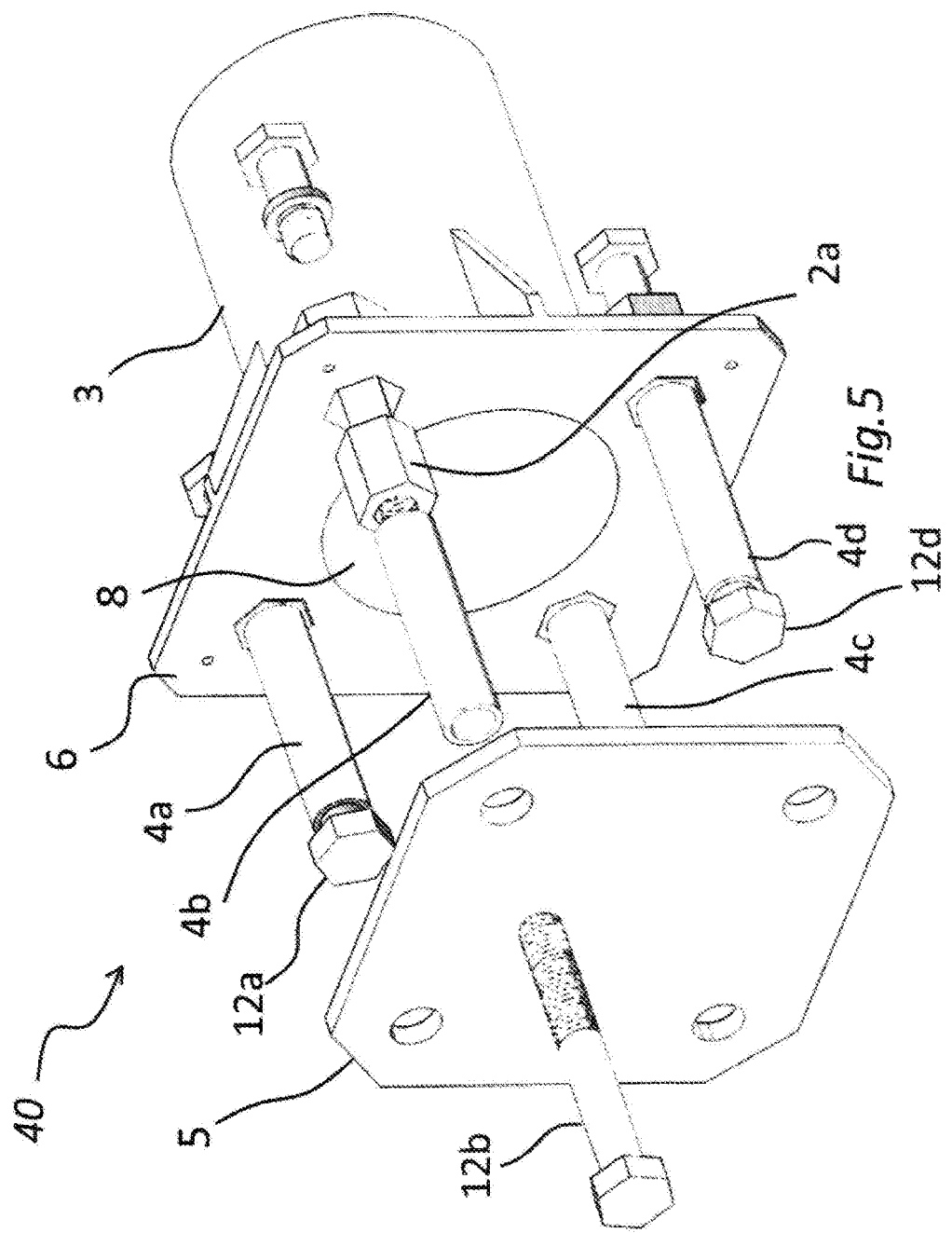
FIG. 5 illustrates an exploded perspective view of an external part of a sealing system.

The external part assembly 40, which is shown in detailed in FIG. 5, comprises a structure having an elongated cylinder 3 and a plate base 6. A flat metal plate 5 is attached to the plate base 6 using four spacers 4a, 4b, 4c, and 4d.

The diameter of the elongated cylinder 3 of the external part assembly 40 is larger than the diameter of the elongated cylinder 13 of the inner part assembly 30. The system 50 is formed by attaching the cylinder 13 of the inner part assembly 30 to the external part assembly 40 by inserting the elongated cylinder 13 into the elongated cylinder 3. In one example, the system 50 may be assembled by adding an extender cylinder 20 between the elongated cylinder 13 and the elongated cylinder 3, where one end of the extender cylinder 20 is inserted into the elongated cylinder 13, and the second end of the extender cylinder 20 is inserted (using low force) to the elongated cylinder 3. One or more extenders, such as cylinder 20, may be used to support transfer in thick walls or buffers in different widths.

FIG. 2 illustrates an exploded perspective view of an inner part assembly 30 of a sealing system. The inner part assembly 30 comprises a box-shaped enclosure 1 having a slot 25, a cavity 22 through which pipes or cables may be carried, holes 24a and 24b (two other not shown in the figures) through which screws may be inserted, an opening 23, and an elongated cylinder 13. A metal plate 11 having holes 21b, 21c and 21d (hole 21a is not shown). The metal plate 11 is used for sealing of the enclosure 1 by using an O-ring 120 that is placed in the slot 25, and is pressed between the metal plate 11 and the enclosure 1 using four threaded screws (exampled by a screw 10). Each threaded screws passes through the corresponding hole in the enclosure 1 and the corresponding hole in the metal plate 11 and is secured with a respective nut (exampled by a nut 8). Upon securing the metal plate 11 to the enclosure 1 using the nuts, the plate 11 may, for example, be used for preventing a blast to the safety room interior environment in case of an external explosion.

The box-shaped enclosure 1, the plate base 6 and the extension cylinders, such cylinders 3, 13 and 20, can be made of plastic.

The inner part 30 further supports water draining capabilities by using an auto-seal zero pressure check valve assembly 7 that is installed via the opening 23 in the bottom of the enclosure 1 in order to maintain drain water flow towards the room exterior.

Figure 3:
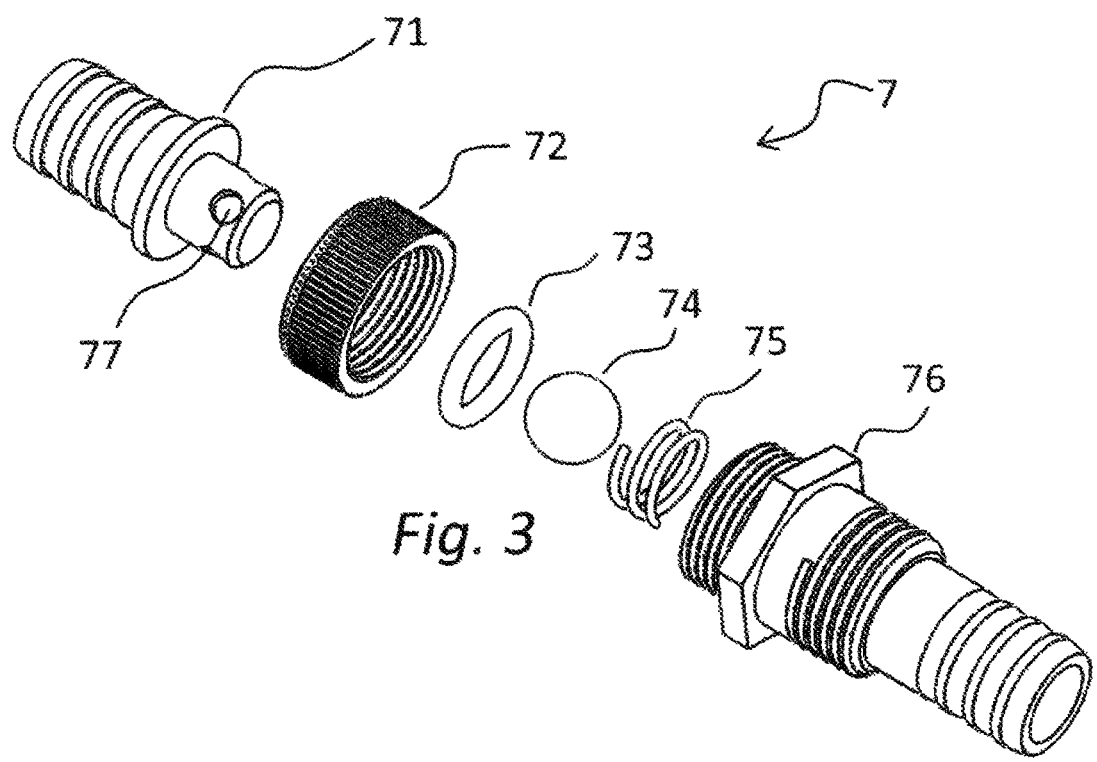
FIG. 3 illustrates an exploded perspective view of an auto-seal zero pressure check valve.
Figure 4:
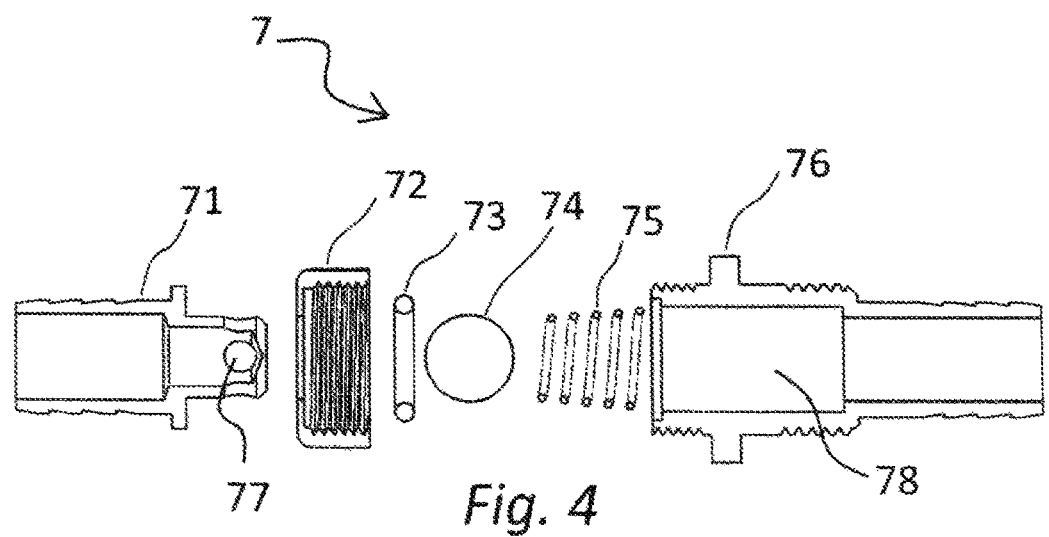
FIG. 4 illustrates a cross section view of an auto-seal zero pressure check valve.

FIGS. 3 and 4 illustrate an auto-seal zero pressure check valve assembly 7.

While the known check valve operates with a high pressure fluid, the auto-seal zero pressure check valve assembly 7, as shown in FIGS. 3 and 4, can be operated with a low pressure fluid such as water draining from an air condition. FIG. 3 illustrates an exploded perspective view of the auto-seal zero pressure check valve assembly 7 and FIG. 4 illustrates a cross section view of the auto-seal zero pressure check valve assembly 7.

The auto-seal zero pressure check valve assembly 7 comprises a hose threaded nipple 76, a spring 75, a valve ball 74, an O-ring 73, and an open nut 72. Further the auto-seal zero pressure check valve assembly 7 comprises a hollow pressing unit 71 having an end unit 77 with holes for allowing a fluid to drain from the hollow pressing unit 71 through the end unit 77 to the hose threaded nipple 76 and to the external area.

In a screwed position of the auto-seal zero pressure check valve assembly 7, the spring 75 is placed in a cavity 78 of the hose threaded nipple 76, the valve ball 74 and the O-Ring 73 are placed on the spring 75. The open nut 72 screws on the hose threaded nipple 76 and constantly pushing the O-ring 73 towards the valve ball 74, the valve ball 74 is pushed towards the spring 75. This position provides constantly sealing of an internal environment, such of a safety room, from an external environment.

The sealing operates in a closed loop manner, as a pressure from the external environment pushes the valve ball 74 that increases its sealing forces toward the O-ring 73 making the sealing tighter. The closed loop operation makes it possible to support extremely low and extremely high pressure sealing with a single valve system.

In non-emergency situations, the pressing unit 71 is easily inserted through the open nut 72 into the auto-seal zero pressure check valve assembly 7. In this position, the pressing unit 71 pushes the valve ball 74 back from the O-ring 73 allowing the draining water from the internal area flows from the hollow pressing unit 71 through the end unit 77 and through the hose threaded nipple 76 to the external area.

The diameter of the end unit 77 is slightly bigger than the inner diameter of the O-Ring 73, for maintaining the pressing unit 71 in place, and for preventing draining water, in a case of a block in a drain pipe and accumulation of water in the drain pipe, to leak into the inner side of a room.

In emergency situations, the pressing unit 71 can be manually removed easily by a user for sealing the interior room and for preventing gas or water to enter the inner side of the room.

FIG. 5 illustrates an external part assembly 40 of a sealing system. The external part assembly 40 is optionally and installed in cases where there is a higher requirement to secure from shrapnel and blast. The external part assembly 40 is normally installed when there is a risk for a direct hit or direct blast on a wall.

The external part assembly 40 comprises a structure having an elongated cylinder 3 and a plate base 6. A flat metal plate 5 is attached to the plate base 6 using four spacers 4a, 4b, 4c and 4d, using four screws 12a, 12b, and 12d (the fourth screw not shown in the figures) and respective nuts 2a (Other 3 nuts are not shown in the figure). The spacers (such as 4a, 4b, 4c and 4d) allow access to an opening 8 of the cylinder 3 while maintaining blast shrapnel protection. The flat metal plate 5 acts as a passive shield from shrapnel and preventing from the explosion blast to go directly to the cylinder 3 into the wall, thus reducing the blast impact on the metal plate 11 of the inner part assembly 30.

Figure 6:
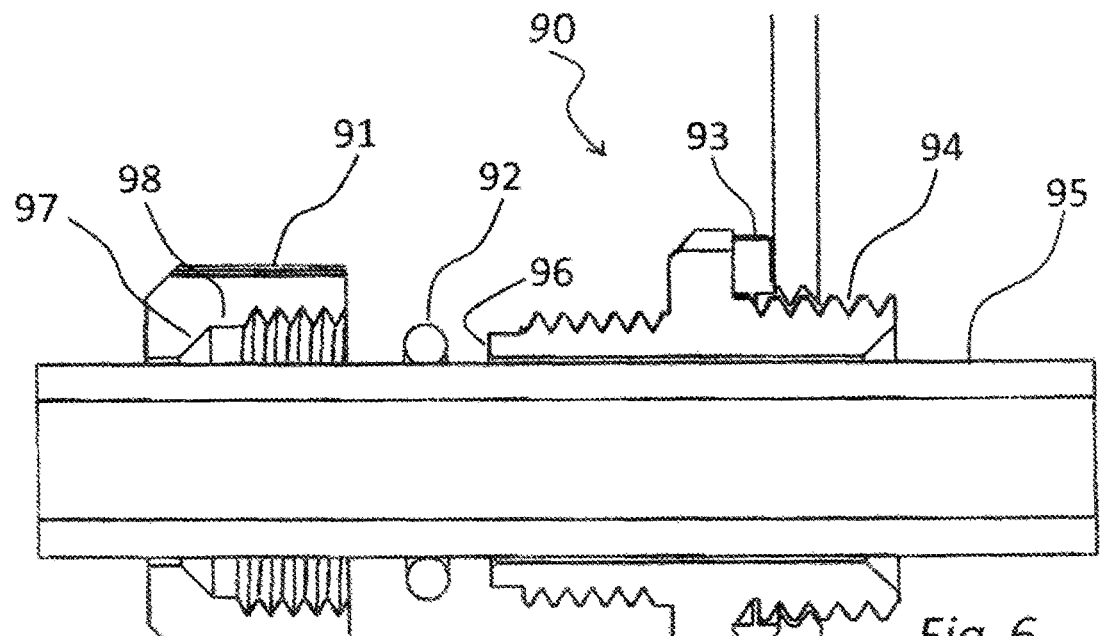
FIG. 6 illustrates a cross section view of a sealing nipple system in an open position.
Figure 7:
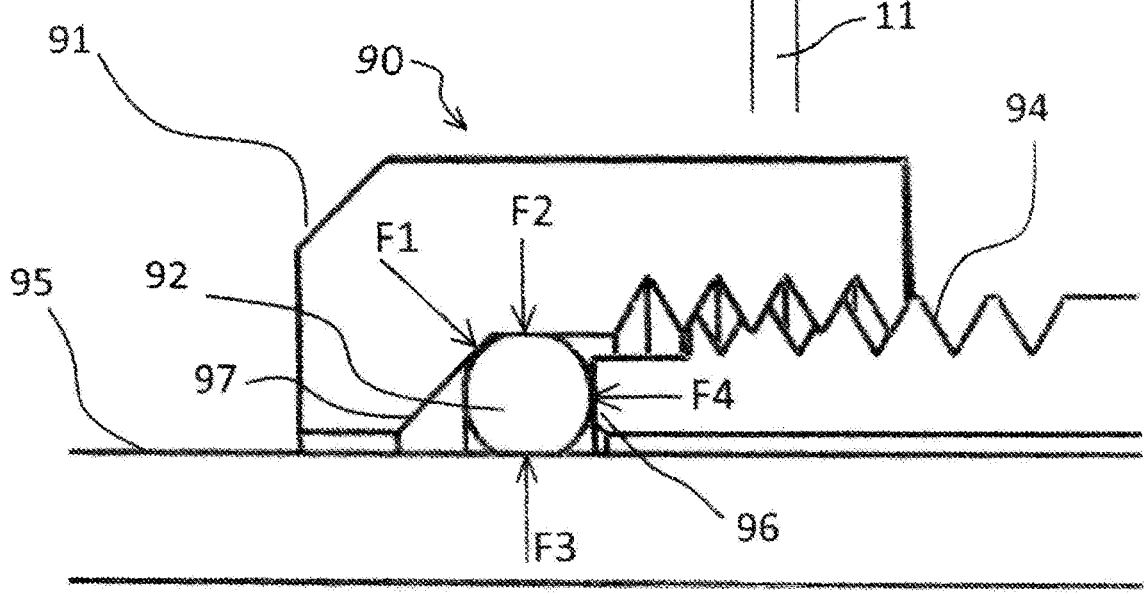
FIG. 7 illustrates a cross section view of a sealing nipple system in a close sealing position.

FIGS. 6 and 7 illustrate a cross section view of a sealing nipple system 90 in an open (unscrew) and close (screwed) position.

FIG. 6 illustrates the sealing nipple system 90 wherein a pipe, cable or wire 95 inserted to a threaded hole in a metal plate 11 in one piece without a need of interfering with the pipe, cable or wire as it passes through a threaded hole.

The sealing nipple system 90 comprises a threaded nipple 94 screwed on the metal plate 11 using a Dowty seal 93 for maintaining the sealing between a first surface of the metal plate 11 and a second surface of the threaded nipple 94. The threaded nipple 94 having a flat edge 96 is configured to seal the pipe, cable or wire.

The sealing nipple system 90 further comprises an O-ring 92 and a flare nut 91 having an internal chamfer 98 with an angle 97. The flare nut 91 presses the O-ring 92 towards the threaded nipple 94 and screwing the threaded nipple 94 generating forces on the O-ring 92 in several directions, thus making the connection sealed.

FIG. 7 illustrates the sealing nipple system 90 in screwed position. The flare nut 91 is fasten over the O-ring 92, and tightened the O-ring 92 to the flat edge 96 of the threaded nipple 94. The tightening generates a force F1 on the O-ring 92. As a result of force F1 and of the angle 97 of the internal chamfer 98, the O-ring 92 is pushed towards the pipe 95 and to the flat edge 96 of the threaded nipple 94. Forces F2 and F3 are equal, and the O-ring is surrounded with forces holding the pipe 95 together maintaining a high sealing capabilities.

For higher sealing results, the angle 97 of the chamfer 98 is preferred to be 45 degrees as the forces F1, F2, F3 and F4 will split equally maintaining the sealing power equal in all directions. There are cases that the material of the pipe has better sealing capabilities like a rubber electric cable and the angle of the chamfer can be adopted in order to divide the forces.

It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof. The terms "plurality" and "a plurality" as used herein includes, for example, "multiple" or "two or more". For example, "a plurality of items" includes two or more items.

Although exemplary embodiments of the present invention have been described, this should not be construed to limit the scope of the appended claims. Those skilled in the art will understand that modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or less steps than those discussed herein.

The invention claimed is:

1. A sealing set for sealing and draining a liquid comprising a check valve and a mating press unit that is separated from, and external to, the check valve, the check valve comprising:
   a first hollow elongated cylinder comprising a first end having a first round opening and a second end having a second round opening, wherein the second opening diameter is less than the elongated cylinder diameter;
   a sealing gasket attached to the second end; and
   a mass and a spring configured to press the mass against the sealing gasket for sealing the second end;
   the mating press unit comprising a second hollow elongated cylinder comprising a third round end and a fourth round end having a fourth round opening, the third round end defining a diameter that is smaller than the second opening diameter and having one or more holes on a perimeter of the third end;
   wherein when the check valve and mating press unit are separated, the check valve is sealed and prevents flow of liquid or gas from the first end to the second opening, and wherein when the mating press unit is manually pressed against the check valve so that the third end is inserted into the second end, a flow of liquid or gas is opened between the first end and the fourth end; such that liquid entering the mating press unit at the fourth end flows from the fourth end, through the mating press unit, through the check valve, and through the first end.

2. The set according to claim 1, wherein the check valve is an auto-seal zero-pressure check-valve, and wherein the sealing gasket comprises an 'O'-ring.

3. The set according to claim 1, wherein the third end is inserted into the second end while pressing the spring.

4. The set according to claim 3, wherein the check valve includes a cylindrical cavity, and wherein the spring is housed in the cavity.

5. The set according to claim 1, wherein the mass is ball-shaped.

6. The set according to claim 1, wherein the first end comprises, or is shaped as, a nipple.

7. The set according to claim 1, wherein the check valve comprises an open nut at the second end.

8. The set according to claim 1, wherein the fourth end of the mating press unit is fluidically connected to a drain line, and, when the third end is inserted into the second end, liquid entering the mating press unit from the drain line flows from the drain line through the first end.

9. The set according to claim 1, wherein the one or more holes are arranged on a lateral face of the mating press unit, thereby causing flow of water out of the mating press unit in a direction that is perpendicular to an axis of flow between the fourth end and the third end.

10. The set according to claim 1, wherein the sealing gasket is an O-ring, and the third end is releasably retained by the O-ring in an interference fit when the third end is inserted into the second end.

11. The set according to claim 1, wherein, when the check valve and mating press unit are separated, the check valve prevents flow of liquid or gas from the first end to the second end in a closed loop manner, whereby increasing external pressure of liquid or gas at the first end increases a sealing force of the mass against the sealing gasket.

12. The set according to claim 1, wherein, when the check valve and mating press unit are separated, fluid entering the mating press unit through the fourth round end exits the mating press unit through the holes of the third round end.

13. A safety room having the set according to claim 1 installed therein, wherein, when the check valve and mating press unit are separated, the check valve is sealed and prevents flow of liquid or gas via the check valve into an interior of the safety room, and fluid entering the mating press unit through the fourth round end exits the mating press unit and outside the set through the holes of the third round end, and when the mating press unit is manually pressed against the check valve so that the third end is inserted into the second end, a flow path of liquid or gas is opened between the first end and the fourth end, whereby fluid entering the mating press unit through the fourth round end flows between the safety room and an external environment.

14. A sealing set for sealing and draining a liquid comprising a check valve and a mating press unit that is separated from, and external to, the check valve, the check valve comprising:
   a first hollow elongated cylinder comprising a first end having a first round opening and a second end having a second round opening, wherein the second opening diameter is less than the elongated cylinder diameter;
   a sealing gasket attached to the second end; and
   a mass and a spring configured to press the mass against the sealing gasket for sealing the second end;
   the mating press unit comprising a second hollow elongated cylinder comprising a third round end and a fourth round end having a fourth round opening, the third round end defining a diameter that is smaller than the second opening diameter and having one or more holes on a perimeter of the third end;
   wherein when the check valve and mating press unit are separated, the check valve is sealed and prevents flow of liquid or gas from the first end to the second opening, and wherein when the mating press unit is manually pressed against the check valve so that the third end is inserted into the second end, a flow of liquid or gas is opened between the first end and the fourth end;
   wherein the one or more holes are arranged on a lateral face of the mating press unit, thereby causing flow of water out of the mating press unit in a direction that is perpendicular to an axis of flow between the fourth end and the third end.

15. A safety room having a sealing set for sealing and draining a liquid installed therein, wherein the sealing set comprises:
   a check valve and a mating press unit that is separated from, and external to, the check valve, the check valve comprising:
      a first hollow elongated cylinder comprising a first end having a first round opening and a second end having a second round opening, wherein the second opening diameter is less than the elongated cylinder diameter;

a sealing gasket attached to the second end; and
a mass and a spring configured to press the mass against the sealing gasket for sealing the second end;
the mating press unit comprising a second hollow elongated cylinder comprising a third round end and a fourth round end having a fourth round opening, the third round end defining a diameter that is smaller than the second opening diameter and having one or more holes on a perimeter of the third end;
wherein, when the check valve and mating press unit are separated, the check valve is sealed and prevents flow of liquid or gas via the check valve into an interior of the safety room, and fluid entering the mating press unit through the fourth round end exits the mating press unit and outside the set through the holes of the third round end, and when the mating press unit is manually pressed against the check valve so that the third end is inserted into the second end, a flow path of liquid or gas is opened between the first end and the fourth end, whereby fluid entering the mating press unit through the fourth round end flows between the safety room and an external environment.

\* \* \* \* \*